US011837763B2

(12) United States Patent
Miftakhov et al.

(10) Patent No.: US 11,837,763 B2
(45) Date of Patent: Dec. 5, 2023

(54) PREDICTIVE FUEL CELL MANAGEMENT SYSTEM FOR AN INTEGRATED HYDROGEN-ELECTRIC ENGINE

(71) Applicant: ZeroAvia, Ltd., Cirencester (GB)

(72) Inventors: Valery Miftakhov, San Carlos, CA (US); Stephen Lawes, Hollister, CA (US)

(73) Assignee: ZeroAvia Ltd, Cirencester (GB)

(*) Notice: Subject to any disclaimer, the term of this patent is extended or adjusted under 35 U.S.C. 154(b) by 1 day.

(21) Appl. No.: 17/657,337

(22) Filed: Mar. 30, 2022

(65) Prior Publication Data
US 2022/0328855 A1 Oct. 13, 2022

Related U.S. Application Data (60) Provisional application No. 63/169,522, filed on Apr. 1, 2021.

(51) Int. Cl.
  *H01M 8/04992* (2016.01)
  *H01M 8/04858* (2016.01)

(52) U.S. Cl.
  CPC ..... *H01M 8/04992* (2013.01); *H01M 8/0494* (2013.01); *H01M 2250/20* (2013.01)

(58) Field of Classification Search
  CPC ........... H01M 8/04992; H01M 8/0494; H01M 2250/20
  See application file for complete search history.

(56) References Cited

U.S. PATENT DOCUMENTS

| 2007/0231630 A1* | 10/2007 | Yoshii ..................... B60L 58/40 |
| | | 429/430 |
| 2020/0307390 A1 | 10/2020 | Clark et al. |
| 2021/0070457 A1 | 3/2021 | Wiegman |
| 2021/0151783 A1* | 5/2021 | Miftakhov ........ H01M 8/04738 |

FOREIGN PATENT DOCUMENTS

KR 102190845 * 12/2020

OTHER PUBLICATIONS

KR102190845 English translation. Kang et al. Korea. Dec. 14, 2020. (Year: 2020).*
SA/EP, International Search Report and Written Opinion for International Application No. PCT/US2022/022681, 11 pages, dated Dec. 9, 2022.

* cited by examiner

*Primary Examiner* — Christopher P Domone (57) ABSTRACT

A system and method for predictive fuel cell management system for an integrated hydrogen-electric engine is disclosed. The system includes a fuel cell stack having a plurality of fuel cells and a computer having a memory and one or more processors. The one or more processors configured to predict, during a first phase of energy demand on the integrated hydrogen-electric engine, an impending occurrence of a second phase of energy demand on the integrated hydrogen-electric engine, wherein the second phase of energy demand includes a predetermined energy demand; and generate a predetermined amount of energy from the plurality of fuel cells based on the predicted second phase of energy demand prior to starting the second phase of energy demand to improve energy efficiency and performance of the integrated hydrogen-electric engine.

20 Claims, 4 Drawing Sheets

PREDICTIVE FUEL CELL MANAGEMENT SYSTEM FOR AN INTEGRATED HYDROGEN-ELECTRIC ENGINE

CROSS-REFERENCE TO RELATED APPLICATIONS (PROVISIONAL)

This application claims priority to and benefit of U.S. Provisional Patent Application No. 63/169,522 filed on Apr. 1, 2021, entitled "PREDICTIVE FUEL CELL MANAGEMENT SYSTEM FOR AN INTEGRATED HYDROGEN-ELECTRIC ENGINE" by Miftakhov et al., and assigned to the assignee of the present application, the disclosure of which is hereby incorporated by reference in its entirety.

FIELD OF THE INVENTION

Embodiments of the present technology relate generally to clean energy-based air propulsion systems, and more particularly, to predictive fuel cell management for integrated for hydrogen-electric systems such as for aircraft transportation systems.

BACKGROUND

A flight regime is a specific set of conditions under which an aircraft operates during a given time period. For example, in commercial flights, flight regimes typically include take-off, climb, cruise, loiter, descent, and landing regimes. Each flight regime may have a unique power requirement from the fuel cell stack. If all the fuel cells are active, there may be flight regimes that do not need the full amount of energy available from the fuel cell stack, and energy will be wasted. However, if not enough fuel cells are active, having an energy demand that is greater than what the fuel cell stack is able to provide may damage the individual fuel cells.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Hydrogen-electric engine systems are disclosed herein as an example use of the system for fuel cell management. However, it should be appreciated that in another embodiment, other systems with different types of fuel cells may be used in conjunction with or in place of one or more of the Hydrogen and/or electric engine systems.

Figure 1:
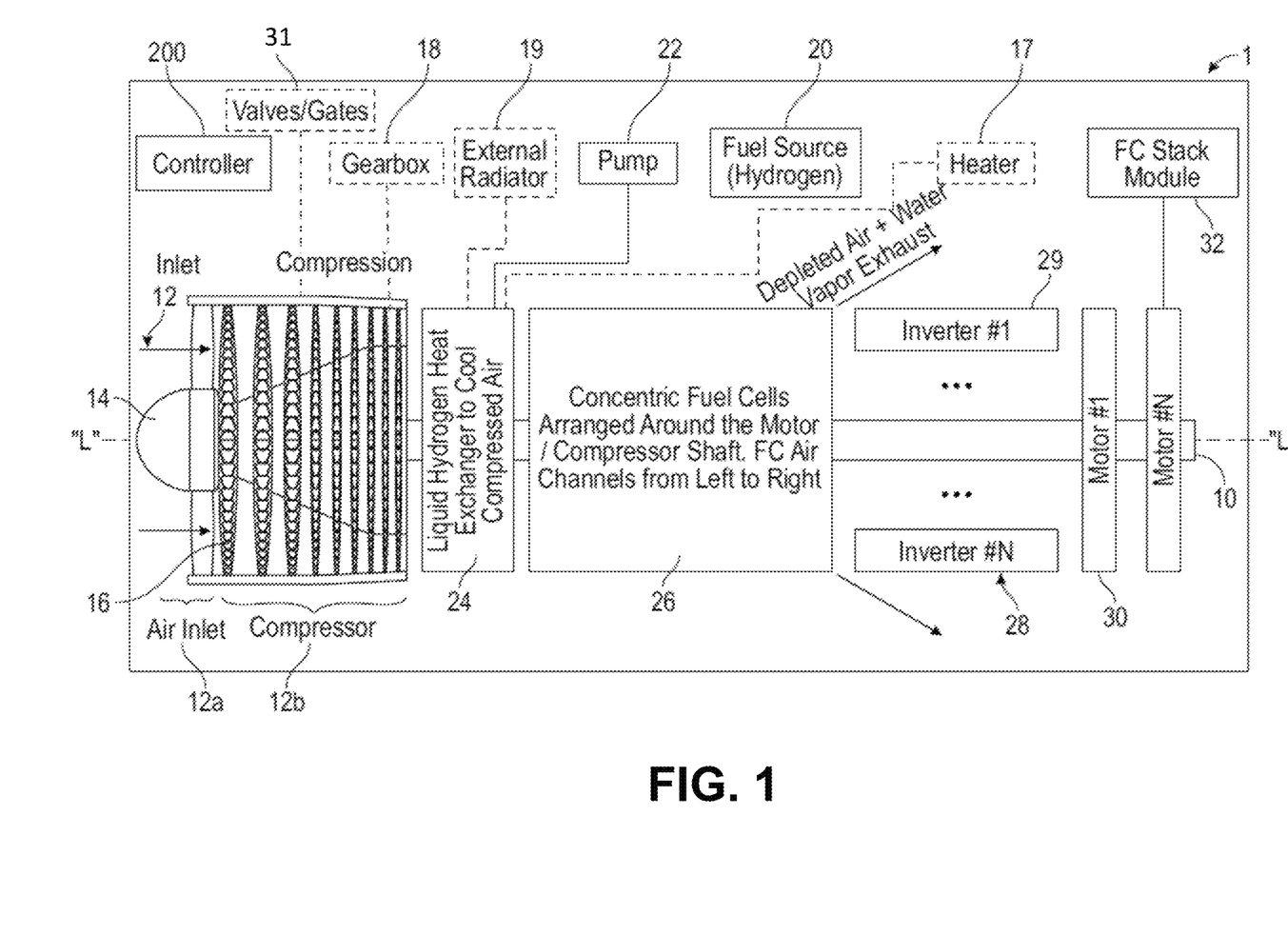
FIG. 1 is a schematic view of an integrated hydrogen-electric engine system, in accordance with an embodiment.

With reference now to FIG. 1, a block diagram of an integrated hydrogen-electric engine system 1 is shown in accordance with one embodiment. In one embodiment, integrated hydrogen-electric engine system 1 is utilize, for example, in a turboprop or turbofan system, to provide a streamlined, lightweight, power-dense, and efficient system. In general, integrated hydrogen-electric engine system 1 includes an elongated shaft 10 that defines a longitudinal axis "L" and extends through the entire powertrain of integrated hydrogen-electric engine system 1 to function as a common shaft for the various components of the powertrain. Elongated shaft 10 supports propulsor 14 (e.g., a fan or propeller) and a multi-stage air compressor system 12, a pump 22 in fluid communication with a fuel source (e.g., hydrogen), a heat exchanger 24 in fluid communication with air compressor system 12, a fuel cell stack 26 in fluid communication with heat exchanger 24, and a motor assembly 30 disposed in electrical communication with the fuel cell stack 26.

Air compressor system 12 of integrated hydrogen-electric engine system 1 includes an air inlet portion 12a at a distal end thereof and a compressor portion 12b that is disposed proximally of air inlet portion 12a for uninterrupted, axial delivery of airflow in the proximal direction. Compressor portion 12b supports a plurality of longitudinally spaced-apart rotatable compressor wheels 16 (e.g., multi-stage) that rotate in response to rotation of elongated shaft 10 for compressing air received through air inlet portion 12a for pushing the compressed air to a fuel cell stack 26 for conversion to electrical energy.

In one embodiment, the number of compressor wheels/stages 16 and/or diameter, longitudinal spacing, and/or configuration thereof can be modified as desired to change the amount of air supply, and the higher the power, the bigger the propulsor 14. These compressor wheels 16 can be implemented as axial or centrifugal compressor stages. Further, the compressor can have one or more bypass valves and/or wastegates 31 to regulate the pressure and flow of the air that enters the downstream fuel cell stack 26, as well as to manage the cold air supply to any auxiliary heat exchangers in the system.

Compressor system 12 can optionally be mechanically coupled to elongated shaft 10 via a gearbox 18 to change (increase and/or decrease) compressor turbine rotations per minute (RPM) and to change the airflow to fuel cell stack 26. For instance, gearbox 18 can be configured to enable the airflow, or portions thereof, to be exhausted for controlling a rate of airflow through the fuel cell stack 26, and thus, the output power.

Integrated hydrogen-electric engine system 1 further includes a gas management system such as a heat exchanger 24 disposed concentrically about elongated shaft 10 and configured to control thermal and/or humidity characteristics of the compressed air from air compressor system 12 for conditioning the compressed air before entering fuel cell stack 26. Integrated hydrogen-electric engine system 1 further also includes a fuel source 20 of fuel cryogenic (e.g., liquid hydrogen (LH2), or cold hydrogen gas) that is operatively coupled to heat exchanger 24 via a pump 22 configured to pump the fuel from fuel source 20 to heat exchanger 24 for conditioning compressed air. In particular, the fuel, while in the heat exchanger 24, becomes gasified because of heating (e.g., liquid hydrogen converts to gas) to take the heat out of the system.

In one embodiment, the hydrogen gas is heated in the heat exchanger 24 to a working temperature of the fuel cell stack 26, which also takes heat out of the compressed air, which results in control of flow through the heat exchanger 24. In one embodiment, a heater 17 can be coupled to or included with heat exchanger 24 to increase the heat as necessary, for instance, when running under a low power regime. Additionally, and/or alternatively, motor assembly 28 can be coupled to heat exchanger 24 for looping in the cooling/heating loops from motor assembly 28 as necessary. Such heating/cooling control can be managed, for instance, via controller 200 of integrated hydrogen-electric engine system 1. In one embodiment, fuel source 20 can be disposed in fluid communication with motor assembly 28 or any other suitable component to facilitate cooling of such components.

Pump 22 can also be coaxially supported on elongated shaft 10 for actuation thereof in response to rotation of elongated shaft 10. Heat exchanger 24 is configured to cool the compressed air received from air compressor system 12 with the assistance of the pumped liquid hydrogen.

Figure 2:
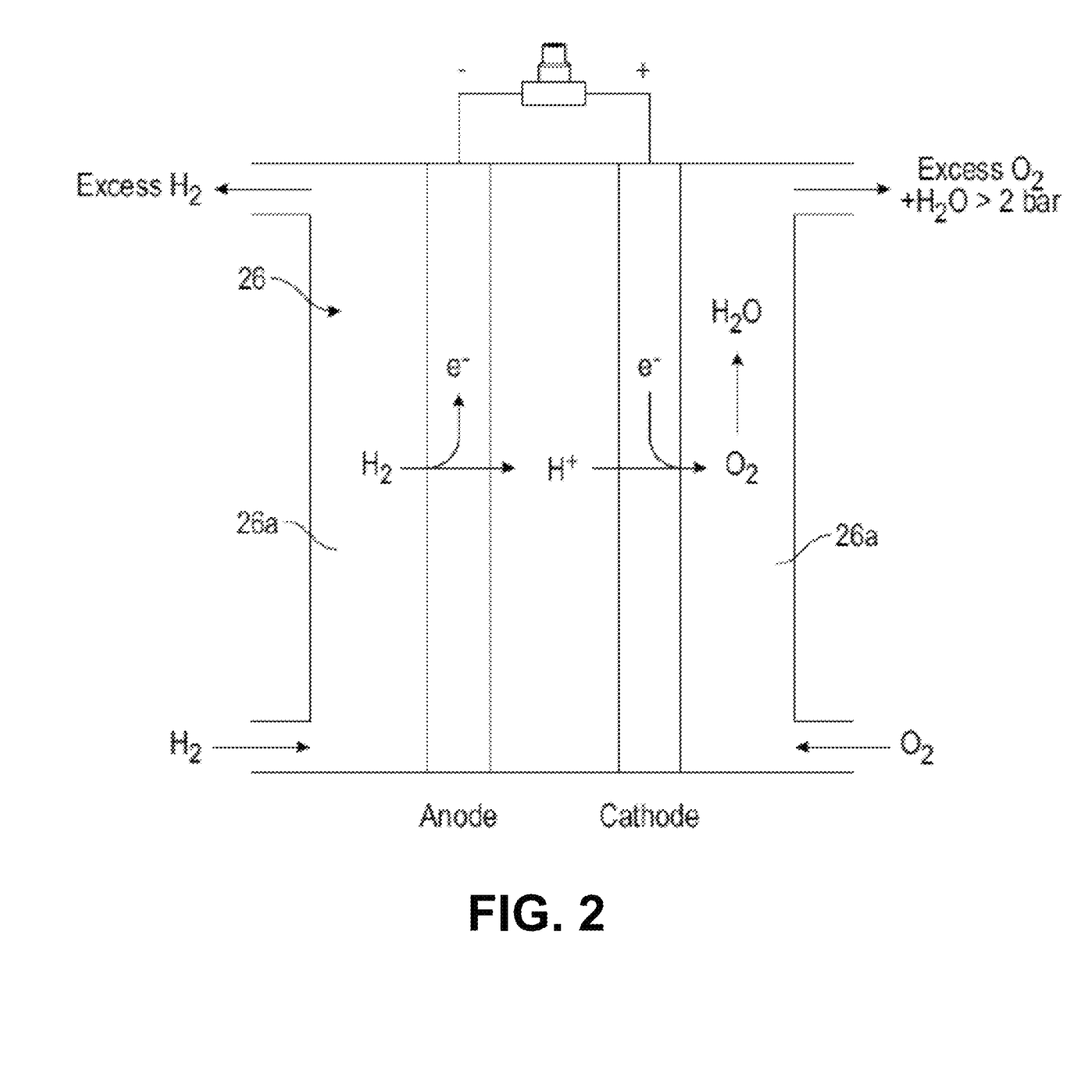
FIG. 2 is a schematic view of a fuel cell of the integrated hydrogen-electric engine system of FIG. 1, in accordance with an embodiment.

With reference also to FIG. 2, integrated hydrogen-electric engine system 1 further includes an energy core in the form of a fuel cell stack 26, which may be circular, and is also coaxially supported on elongated shaft 10 (e.g., concentric) such that any air channels of fuel cell stack 26 may be oriented in parallel relation with elongated shaft 10 (e.g., horizontally or left-to-right). Fuel cell stack 26 may be in the form of a proton-exchange membrane fuel cell (PEMFC). The fuel cells of the fuel cell stack 26 are configured to convert chemical energy liberated during the electrochemical reaction of hydrogen and oxygen to electrical energy (e.g., direct current). Depleted air and water vapor are exhausted from fuel cell stack 26. The electrical energy generated from fuel cell stack 26 is then transmitted to the motor assembly, which is also coaxially/concentrically supported on elongated shaft 10.

In one embodiment, integrated hydrogen-electric engine system 1 may include any number of external radiators 19 (FIG. 1) for facilitating airflow and adding, for instance, additional cooling. Notably, fuel cell stack 26 can include liquid-cooled and/or air-cooled cell types so that cooling loads are integrated into heat exchanger 24 for reducing the total amount of external radiators needed in the system.

The motor assembly of integrated hydrogen-electric engine system 1 includes a plurality of inverters 28 and 29 configured to convert the direct current to alternating current for actuating one or more of a plurality of motors 30 in electrical communication with the inverters 28 and 29. The plurality of motors 30 are configured to drive (e.g., rotate) the elongated shaft 10 in response to the electrical energy received from fuel cell stack 26 for operating the components on the elongated shaft 10 as elongated shaft 10 rotates.

In one embodiment, one or more of the inverters 28 and 29 may be disposed between motors 30 (e.g., a pair of motors) to form a motor subassembly, although any suitable arrangement of motors 30 and inverters 28 and 29 may be provided. The motor assembly can include any number of motor subassemblies supported on elongated shaft 10 for redundancy and/or safety. In one embodiment, the motor assembly can include any number of fuel cell stack modules 32 configured to match the power of the motors 30 and the inverters 28 and 29 of the subassemblies. In this regard, for example, during service, the fuel cell stack modules 32 can be swapped in/out. Each fuel cell stack modules 32 can provide any power, such as 400 kw or any other suitable amount of power, such that when stacked together (e.g., 4 or 5 modules), total power can be about 2 Megawatts on the elongated shaft 10. In embodiments, motors 30 and inverters 28 and 29 can be coupled together and positioned to share the same thermal interface so a motor casing of the motors 30 is also an inverter heat sink so only a single cooling loop goes through the motor assembly for cooling the inverters 29 and the motors 30 at the same time. This reduces the number of cooling loops and therefore the complexity of the system.

Integrated hydrogen-electric engine system 1 further includes a controller 200 (e.g., a full authority digital engine (or electronics) control (e.g., a FADEC) for controlling the various embodiments of the integrated hydrogen-electric engine system 1 and/or other components of the aircraft system. For instance, controller 200 can be configured to manage a flow of liquid hydrogen, manage coolant liquids from the motor assembly 28, manage, for example, any dependent auxiliary heater for the liquid hydrogen, manage rates of hydrogen going into fuel cell stack 32, manage rates of heated/cooled compressed air, and/or various flows and/or power of integrated hydrogen-electric engine system 1. The algorithm for managing these thermal management components can be designed to ensure the most efficient use of the various cooling and heating capacities of the respective gases and liquids to maximize the efficiency of the system and minimize the volume and weight of the same. For example, the cooling capacity of liquid hydrogen or cool hydrogen gas (post-gasification) can be effectively used to cool the hot compressor discharge air to ensure the correct temperature range in the fuel cell inlet. Further, the cooling liquid from the motor-inverter cooling loop could be integrated into the master heat exchanger and provide the additional heat required to gasify hydrogen and heat it to the working fuel cell temperature.

Figure 3:
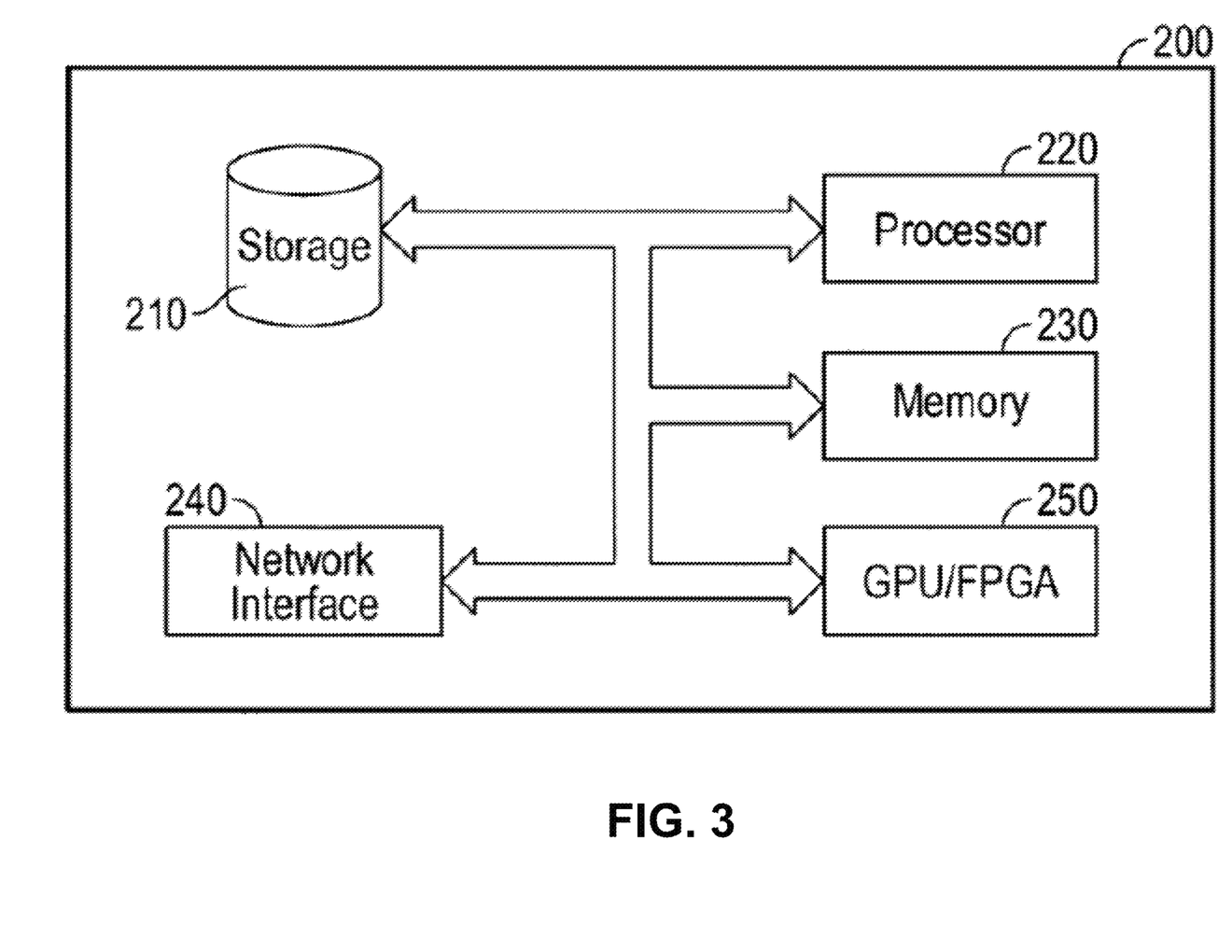
FIG. 3 is a block diagram of a controller configured for use with the integrated hydrogen-electric engine system of FIG. 1, in accordance with an embodiment.

FIG. 3 illustrates that controller 200 includes a processor 220 connected to a computer-readable storage medium or a memory 230. The computer-readable storage medium or memory 230 may be a volatile type of memory, e.g., RAM, or a non-volatile type memory, e.g., flash media, disk media, etc. In one embodiment, the processor 220 may be another type of processor such as, without limitation, a digital signal processor, a microprocessor, an ASIC, a graphics processing unit (GPU), a field-programmable gate array (FPGA), or a central processing unit (CPU). In one embodiment, network inference may also be accomplished in systems that have weights implemented as memristors, chemically, or other inference calculations, as opposed to processors.

In one embodiment, the memory 230 can be random access memory, read-only memory, magnetic disk memory, solid-state memory, optical disc memory, and/or another type of memory. In one embodiment, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In one embodiment, the controller 200 may include a network interface 240 to communicate with other computers or to a server. A storage device 210 may be used for storing data.

The disclosed method may run on the controller 200 or on a user device, including, for example, on a mobile device, an IoT device, or a server system.

The controller 200 is configured to receive, among other data, the fuel supply status, aircraft location, and control, among other features, the pumps, motors, sensors, etc.

Further, as can be appreciated, the integrated hydrogen-electric engine system 1 can include any number and/or type of sensors, electrical components, and/or telemetry devices that are operatively coupled to controller 200 for facilitating the control, operation, and/or input/out of the various components of integrated hydrogen-electric engine system 1 for improving efficiencies and/or determining errors and/or failures of the various components.

For a more detailed description of components of similar hydrogen-electric engine systems, one or more components of which can used or modified for use with the structure of the present disclosure, reference can be made, for example, to U.S. patent application Ser. No. 16/950,735.

Figure 4:
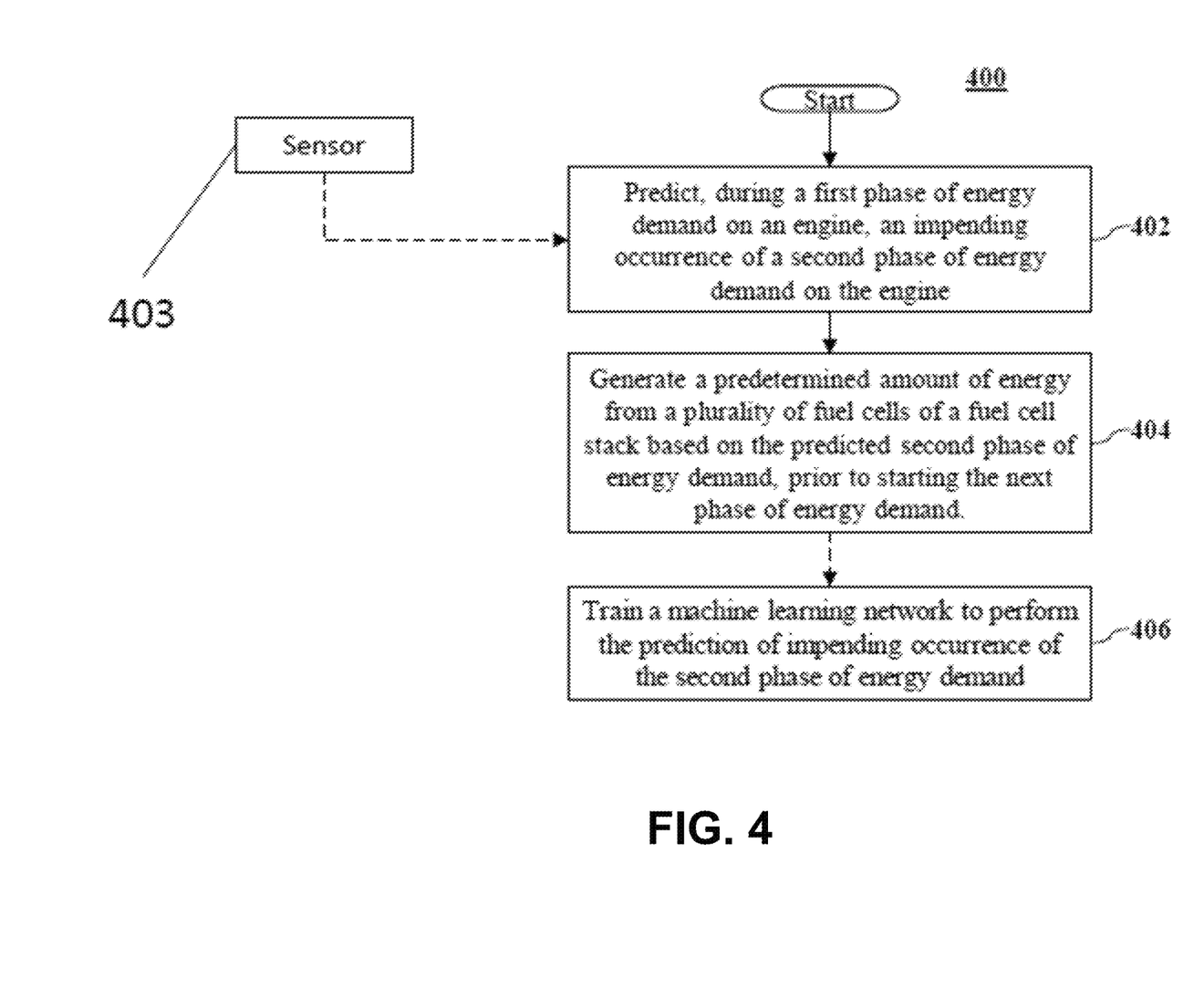
FIG. 4 is a flow diagram of a method for predictive fuel cell management of an integrated hydrogen-electric engine, in accordance with an embodiment.

Referring to FIG. 4, a flow chart of an exemplary computer-implemented method 400 for dynamic optimization of system efficiency for the integrated hydrogen-electric engine 1.

Although the steps of FIG. 4 are shown in a particular order in one embodiment, in another embodiment, the steps may be performed in another order. For simplicity, FIG. 4 will be described below, with the controller 200 performing the operations. However, in various aspects, the operations of FIG. 4 may be performed in part by the controller 200 of FIG. 3 and in part by another device, such as a remote server. These variations are contemplated to be within the scope of the present disclosure.

Initially, at step 402, the operation predicts, during a first phase of energy demand (e.g., a first flight regime, for example, descent) on the integrated hydrogen-electric engine, an impending occurrence of a second phase of energy demand (e.g., a second flight regime, for example, landing) on the integrated hydrogen-electric engine. The second phase of energy demand includes a predetermined energy demand of the integrated hydrogen-electric engine.

The first phase of energy demand may be associated with a first flight regime and the second phase of energy demand may be associated with a second flight regime that is different from the first flight regime. A flight regime is a specific condition under which an aircraft operates during a given time period. For example, in commercial flights, flight regimes may include the non-limiting list of takeoff, climb, cruise, loiter, descent, and/or landing regimes. Each flight regime (e.g., landing) may have a unique power requirement from the fuel cell stack 32. If all the fuel cells are active, there may be flight regimes that do not need the full amount of energy available from the fuel cell stack 32, and energy may be wasted. However, if not enough fuel cells are active, then an energy demand that is above what the fuel cell stack 32 can provide may damage the individual fuel cells. Thus, the disclosed technology has the benefit of enabling more efficient use of fuel cells and reducing air pollution. Other regimes are contemplated, such as a low power and a high power regime.

In one embodiment, the prediction is based on a sensor signal (e.g., a throttle signal, an altitude signal, and/or a GPS signal) from a sensor 403. A system's energy demand may include different levels of demand depending on which phase of an operation the system using the energy from a fuel cell stack 32 (FIG. 2) is in. For example, a jet may have a higher energy demand during the first phase (e.g., climbing) than during the second phase (e.g., cruise).

In one embodiment, the prediction may be performed by pattern recognition. For example, the operation may recognize a pattern, for a jet, where the first phase of energy demand (e.g., cruise) before the impending second phase of energy demand (e.g., descent) and enable the operation to predict that next time the jet is in "cruise" that the second phase of energy demand likely would be "descent." In aspects, the pattern recognition may include a machine learning network, for example, a probabilistic classifier, a decision tree, a support vector machine, and/or a Naive Bayes classifier.

At step 404, the operation generates a predetermined amount of energy from the plurality of fuel cells of a fuel cell stack 32 based on the predicted energy demand, prior to starting the second phase of energy demand. Each fuel cell of the fuel cell stack may be a hydrogen-electric fuel cell. In aspects, the operation may generate the predetermined amount of energy by activating a predetermined quantity of the plurality of fuel cells of the fuel cell stack. In aspects, the system may include multiple fuel cell stacks in series, parallel, and/or in combination. The system may activate the fuel cells by turning the individual fuel cells on or off at different intervals, timing, etc. In aspects, the operation may vary pump pressures (hydrogen and/or oxygen) (e.g., pump 22 of FIG. 1), motor speeds (e.g., motor assembly 28 which is coupled with a heat exchanger 24 of FIG. 1), fan speeds (e.g., propulsor 14 of FIG. 1), and/or turn on/off auxiliary batteries, to generate the predetermined amount of energy. For example, in a case where less energy is required, the operation may increase the motor speed of motor assembly 28, which is coupled with a heat exchanger 24, to increase the heat as necessary. In another example, the operation may increase or decrease the pressure from pump 22 (FIG. 1), which is in fluid communication with a fuel source 20 (e.g., hydrogen) to pump the fuel to heat exchanger 24 for conditioning compressed air. The fuel, while in the heat exchanger 24, becomes gasified because of heating to take the heat out of the system. The hydrogen gas then gets heated in the heat exchanger 24 to a working temperature of the fuel cell 26, which also takes heat out of the compressed air, which results in control of flow through the heat exchanger 24 regulating the generated amount of energy accordingly.

At step 406, the operation may train the machine learning network based on the predicted impending occurrence of the second phase of energy demand on the integrated hydrogen-electric engine and/or the first phase of energy demand on the integrated hydrogen-electric engine. Training may include supervised and/or unsupervised training. Training data may include, for example, energy usage, length of time that either of the phases of energy demand lasted, and/or energy demand for a prior or subsequent phase of energy demand. By training the machine learning network, the operation can better predict the behavior and energy requirements of various phases of energy demand (e.g., regimes). For example, the machine learning network may be trained on data that indicates that more energy is used during a climb regime than during a cruise regime, and what typical energy demands would be during those portions of flight, better enabling the machine learning network to predict that the next time the machine learning network receives data indicating that the first phase of energy demand is the climb regime, then the impending second phase of energy demand would have a high probability of being the cruise regime.

In one embodiment, the operation may display, on a display, the predicted impending second phase of energy demand on the integrated hydrogen-electric engine. For example, if the first phase of energy demand on the integrated hydrogen-electric engine is a take-off, the operation may display an indication that the second phase of energy demand on the integrated hydrogen-electric engine is the climb regime.

In one embodiment, the operation may manage from BOP to a stage of flight (e.g., spin up the compressor system 12 of FIG. 1 and pre-heat the fuel cell stack 32 during the landing regime to allow for a fast ramp on go-around) to improve the energy efficiency of the system. In aspects, the operation may determine errors and/or anomalous conditions based on the predicted second phase of energy demand. For example, the operation may determine a phase of energy demand's (e.g., a regime's) optimal and/or energy-efficient operating configuration. During, for example, flight, the operation may determine that a phase of energy demand that the system is currently in (e.g., cruise) is not operating in the most energy-efficient manner (e.g., the fuel cell stack 32 may be generating much more energy than actual demand). The operation may determine that to improve the efficiency of the system, less energy should be generated for the same phase of energy demand next time that phase is encountered, and the operation would adjust the system accordingly (e.g., by generating less energy for use during the cruise regime).

It should be understood the disclosed structure can include any suitable mechanical, electrical, and/or chemical components for operating the disclosed system or components thereof. For instance, such electrical components can include, for example, any suitable electrical and/or electromechanical and/or electrochemical circuitry, which may include or be coupled to one or more printed circuit boards. As appreciated, the disclosed computing devices and/or server can include, for example, a "controller," "processor," "digital processing device" and like terms, and which are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In one embodiment, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In one embodiment, the operating system is provided by cloud computing.

In one embodiment, the term "controller" may be used to indicate a device that controls the transfer of data from a computer or computing device to a peripheral or separate device and vice versa, and/or a mechanical and/or electromechanical device (e.g., a lever, knob, etc.) that mechanically operates and/or actuates a peripheral or separate device.

In one embodiment, the controller includes a storage and/or memory device. The storage and/or memory device is one or more physical apparatus used to store data or programs on a temporary or permanent basis. In one embodiment, the controller includes volatile memory and requires power to maintain stored information. In one embodiment, the controller includes non-volatile memory and retains stored information when it is not powered. In one embodiment, the non-volatile memory includes flash memory. In one embodiment, the non-volatile memory includes dynamic random-access memory (DRAM). In one embodiment, the non-volatile memory includes ferroelectric random-access memory (FRAM). In one embodiment, the non-volatile memory includes phase-change random access memory (PRAM). In one embodiment, the controller is a storage device including, by way of non-limiting examples, CD-ROMs, DVDs, flash memory devices, magnetic disk drives, magnetic tapes drives, optical disk drives, and cloud-computing-based storage. In one embodiment, the storage and/or memory device is a combination of devices such as those disclosed herein.

In one embodiment, the memory can be random access memory, read-only memory, magnetic disk memory, solid state memory, optical disc memory, and/or another type of memory. In one embodiment, the memory can be separate from the controller and can communicate with the processor through communication buses of a circuit board and/or through communication cables such as serial ATA cables or other types of cables. The memory includes computer-readable instructions that are executable by the processor to operate the controller. In one embodiment, the controller may include a wireless network interface to communicate with other computers or a server. In one embodiment, a storage device may be used for storing data. In one embodiment, the processor may be, for example, without limitation, a digital signal processor, a microprocessor, an ASIC, a graphics processing unit ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, in one embodiment, a controller may be remote from the disclosed structure (e.g., on a remote server), and accessible by the disclosed structure via a wired or wireless connection. In one embodiment where the controller is remote, it may be accessible by, and connected to, multiple structures and/or components of the disclosed system.

The term "application" may include a computer program designed to perform particular functions, tasks, or activities for the benefit of a user. Application may refer to, for example, software running locally or remotely, as a stand-alone program or in a web browser, or other software which would be understood by one skilled in the art to be an application. An application may run on the disclosed controllers or on a user device, including for example, on a mobile device, an IoT device, or a server system.

In one embodiment, the controller includes a display to send visual information to a user. In one embodiment, the display is a cathode ray tube (CRT). In one embodiment, the display is a liquid crystal display (LCD). In one embodiment, the display is a thin film transistor liquid crystal display (TFT-LCD). In one embodiment, the display is an organic light-emitting diode (OLED) display. In one embodiment, on OLED display is a passive-matrix OLED (PMOLED) or active-matrix OLED (AMOLED) display. In one embodiment, the display is a plasma display. In one embodiment, the display is a video projector. In one embodiment, the display is interactive (e.g., having a touch screen or a sensor such as a camera, a 3D sensor, a LiDAR, a radar, etc.) that can detect user interactions/gestures/responses and the like. In one embodiment, the display is a combination of devices such as those disclosed herein.

The controller may include or be coupled to a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber-optic network, a satellite network, and/or an IEEE 802.11a/b/g/n/ac wireless network, among others.

In one embodiment, the controller can be coupled to a mesh network. As used herein, a "mesh network" is a network topology in which each node relays data for the network. In general, mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In one embodiment, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines or sections of programs that perform a particular task.

As used herein, the controller includes software modules for managing various functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

Any of the herein described methods, programs, algorithms, or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A system for predictive fuel cell management system for an integrated hydrogen-electric engine, said system comprising:
   a fuel cell stack comprising a plurality of fuel cells; and
   a computer comprising:
      a memory; and one or more processors, said one or more processors configured to:
  predict, during a first phase of energy demand on said integrated hydrogen-electric engine, an impending occurrence of a second phase of energy demand on said integrated hydrogen-electric engine, wherein said second phase of energy demand includes a predetermined energy demand; and
  generate a predetermined amount of energy from said plurality of fuel cells based on said prediction of said impending occurrence of said second phase of energy demand prior to starting said second phase of energy demand to improve energy efficiency and performance of said integrated hydrogen-electric engine.

2. The system of claim 1, further comprising a sensor configured to generate a sensor signal, wherein said prediction of said impending occurrence of said second phase of energy demand is based on said sensor signal.

3. The system of claim 1, wherein said prediction of said impending occurrence of said second phase of energy demand is based on a pattern recognition.

4. The system of claim 3, wherein said pattern recognition includes a machine learning network including at least one from a group consisting of: a probabilistic classifier, a decision tree, a support vector machine, and a Naive Bayes classifier.

5. The system of claim 1, wherein generating said predetermined amount of energy from said plurality of fuel cells is performed by at least one of activating a predetermined quantity of said plurality of fuel cells of said fuel cell stack, varying a pump pressure of a pump of said system, or varying a motor speed of a motor assembly of said system.

6. The system of claim 1, wherein said plurality of fuel cells includes at least one hydrogen-electric fuel cell.

7. The system of claim 1, wherein said first phase of energy demand is associated with a first flight regime.

8. The system of claim 7, wherein said second phase of energy demand is associated with a second flight regime that is different from said first flight regime.

9. The system of claim 8, wherein said first flight regime and said second flight regime include at least one of take-off, climb, cruise, loiter, descent, or landing.

10. The system of claim 1, further comprising:
a display to display said prediction of said impending occurrence of said second phase of energy demand.

11. A computer-implemented method for fuel cell management of an integrated hydrogen-electric engine, said computer-implemented method comprising:
  predicting, during a first phase of energy demand on said integrated hydrogen-electric engine, an impending occurrence of a second phase of energy demand on said integrated hydrogen-electric engine, wherein said second phase of energy demand includes a predetermined energy demand; and
  generating a predetermined amount of energy from a plurality of fuel cells of a fuel cell stack, based on said predetermined energy demand prior to starting said second phase of energy demand to improve energy efficiency and performance of said integrated hydrogen-electric engine.

12. The computer-implemented method of claim 11, wherein said predicting of said impending occurrence of said second phase of energy demand is based on a sensor signal.

13. The computer-implemented method of claim 11, wherein said predicting of said impending occurrence of said second phase of energy demand is based on a pattern recognition.

14. The computer-implemented method of claim 13, wherein said pattern recognition includes a machine learning network including at least one from a group consisting of: a probabilistic classifier, a decision tree, a support vector machine, and a Naive Bayes classifier.

15. The computer-implemented method of claim 11, wherein generating said predetermined amount of energy from said plurality of fuel cells is performed by at least one of activating a predetermined quantity of said plurality of fuel cells of said fuel cell stack, varying a pump pressure of a pump, or varying a motor speed of a motor assembly.

16. The computer-implemented method of claim 11, wherein said first phase of energy demand is associated with a first flight regime.

17. The computer-implemented method of claim 16, wherein said first flight regime includes at least one of a take-off, climb, cruise, loiter, descent, or landing.

18. The computer-implemented method of claim 16, wherein said second phase of energy demand includes a next flight regime, including at least one of take-off, climb, cruise, loiter, descent, or landing, different than said first flight regime.

19. The computer-implemented method of claim 11, further comprising displaying on a display said predicted next phase of energy demand.

20. A non-transitory computer readable storage medium having computer readable program code stored thereon for causing a computer system to perform a method for predictive fuel cell management system for an integrated hydrogen-electric engine, said method comprising:
  predicting, during a first phase of energy demand on said integrated hydrogen-electric engine, an impending occurrence of a second phase of energy demand on said integrated hydrogen-electric engine, wherein said second phase of energy demand includes a predetermined energy demand; and
  generating a predetermined amount of energy from a plurality of fuel cells of a fuel cell stack, based on said predetermined energy demand prior to starting said second phase of energy demand to improve energy efficiency and performance of said integrated hydrogen-electric engine.

* * * * *